United States Patent [19]

Farnsworth

[11] Patent Number: 4,666,586

[45] Date of Patent: * May 19, 1987

[54] METHOD AND ARRANGEMENT OF APPARATUS FOR CRACKING HIGH BOILING HYDROCARBON AND REGENERATION OF SOLIDS USED

[76] Inventor: Carl D. Farnsworth, 2401 Sedley Rd., Charlotte, N.C. 28211

[*] Notice: The portion of the term of this patent subsequent to Oct. 23, 2001 has been disclaimed.

[21] Appl. No.: 568,354

[22] Filed: Jan. 5, 1984

Related U.S. Application Data

[63] Continuation-in-part of Ser. No. 540,359, Oct. 11, 1983, Pat. No. 4,478,708.

[51] Int. Cl.⁴ .................. C10G 11/18; F27B 1/20
[52] U.S. Cl. .................... 208/161; 208/164; 502/40; 502/43; 55/1
[58] Field of Search ............... 208/113, 161, 127, 164; 422/144, 145, 147; 502/49, 40, 41, 42, 43; 55/1, 342, 343, 349

[56] References Cited

U.S. PATENT DOCUMENTS

| | | | |
|---|---|---|---|
| 2,654,699 | 10/1953 | Lesher | 208/161 |
| 3,123,547 | 3/1964 | Palmer et al. | 208/78 |
| 3,406,112 | 10/1968 | Bowles | 208/153 |
| 3,755,136 | 8/1973 | Fields et al. | 208/10 |
| 3,785,962 | 1/1974 | Conner et al. | 208/164 |
| 3,821,103 | 6/1974 | Owen et al. | 208/72 |
| 3,898,050 | 8/1975 | Strother | 208/164 |
| 4,035,284 | 7/1977 | Gross et al. | 208/120 |
| 4,219,407 | 8/1980 | Haddad et al. | 208/151 |
| 4,280,898 | 7/1981 | Tatterson et al. | 208/119 |
| 4,283,273 | 8/1981 | Owen | 208/113 |
| 4,284,494 | 8/1981 | Bartholic et al. | 208/164 |
| 4,295,961 | 10/1981 | Fahrig et al. | 208/161 |
| 4,313,910 | 2/1982 | Dues et al. | 422/147 |
| 4,332,674 | 6/1982 | Dean et al. | 208/120 |
| 4,341,624 | 7/1982 | Myers | 208/120 |
| 4,387,043 | 6/1983 | Vickers et al. | 208/164 |
| 4,394,349 | 7/1983 | Cartmell | 208/153 |
| 4,397,738 | 8/1983 | Kemp | 208/161 |
| 4,404,095 | 9/1983 | Haddad et al. | 208/161 |
| 4,419,221 | 12/1983 | Castagnos, Jr. et al. | 208/113 |
| 4,422,925 | 12/1983 | Williams et al. | 208/75 |
| 4,478,708 | 10/1984 | Farnsworth | 208/161 |

Primary Examiner—Olik Chaudhuri
Attorney, Agent, or Firm—Richard C. Willson, Jr.; Stanley M. Welsh

[57] ABSTRACT

A method and arrangement of apparatus is provided for catalytically cracking liquid hydrocarbons to form gaseous and liquid fuel products and effect regeneration of the used catalyst particles whereby means are provided which improve separation of formed suspensions in a substantially reduced time frame and combustion of substantial hydrocarbonaceous deposits is accomplished under restricted temperature conditions contributing to catalyst life in a two stage catalyst regeneration operation of restricted elevation. The apparatus combination of the present invention is preferably of low vertical profile by restricting the vertical length of the riser contact zone in one embodiment by providing a substantial horizontal section thereof in a downstream portion of the riser.

16 Claims, 2 Drawing Figures

METHOD AND ARRANGEMENT OF APPARATUS FOR CRACKING HIGH BOILING HYDROCARBON AND REGENERATION OF SOLIDS USED

This application is a CIP of application 540,359 filed 10/11/83 now U.S. Pat. No. 4478708, issued Oct. 23, 1984.

BACKGROUND OF THE INVENTION

This invention relates to the catalytic conversion of hydrocarbons and the regeneration of catalyst particles used in a sequence of two stage regeneration as a means for restricting combustion temperatues encountered during the removal of carbonaceous deposits of hydrocarbon conversion. In a particular aspect the present invention is concerned with a low profile catalytic cracking-catalyst regeneration system which effectively achieves a rapid separation of formed suspension within a restricted and desired time frame of operation.

The prior art is full of many different arrangements of vessels for achieving the catalytic conversion of oil feeds and regeneration of catalyst employed. Many of these system arrangements perform particularly desired operating functions peculiar to the operation and concept of invention contemplated. With the development of high activity zeolite cracking catalyst and variations thereon depending on the crystal structure employed as well as the hydrocarbon feed to be converted there has been a need to develop some particular apparatus arrangements for some particular conversion operations. In most of these operations there is a need to limit hydrocarbon conversion time and temperature in a riser hydrocarbon conversion zone and limit the temperature of the regeneration operation to avoid damage to the catalyst. Various techniques have been employed in the prior art to accomplish each of these ends.

Palmer etal U.S. Pat. No. 3,123,547 discloses an expanding riser reaction tube of more restricted dimensions at its discharge end where the suspension is passed through slotted openings in the riser wall.

Haddad etal U.S. Pat. No. 4,219,407 discharges a suspension from a riser by radially extending arms of inverted channels which curve downward at the outer extremity thereof.

Heffley etal U.S. Pat. No. 4,173,527 discharges a suspension from a riser by first centrifugally spinning the suspension so that centrifugally separated solids pass outside a smaller diameter vapor withdrawal pipe coaxially aligned with the riser outlet.

Stine etal U.S. Pat. No. 3,838,036 and many others discharge a hydrocarbon-catalyst suspension from a conversion zone directly into cyclone separation zones. Numerous other patents in the prior art such as Vermilion Jr. U.S. Pat. No. 4,064,038 and Owen U.S. Pat. No. 3,886,060 also discharge directly into cyclones from riser contact zones.

Greensfelder etal U.S. Pat. No. 2,398,739 discloses two stage dense fluid catalyst bed regeneration in a side-by-side arrangement.

Thomas etal U.S. Pat. No. 2,414,002 discloses a dense phase catalyst upflow regeneration operation followed by a more dense catalyst phase downflow regeneration zone. Other two stage regeneration arrangements of the prior art include Jahnig U.S. Pat. No. 2,434,567, Jewell U.S. Pat. No. 2,882,218; Rowe 4,388,218; Dean etal U.S. Pat. ;b 4,332,674; Pfeiffer etal U.S. Pat. No. 3,563,911; Luckenbach U.S. Pat. No. 3,902,990 and Luckenbach U.S. Pat. No. 4,176,084 among many others.

The present invention is concerned with a unique technique for separating a suspension discharged from a riser conversion or regeneration zone. The present invention is also concerned with a unique technique for effecting two stage regeneration of catalyst particles in temperature controlled atmospheres whereby hydrocarbonaceous deposits may be removed to a desired low residual coke level for recycle to a hydrocarbon conversion zone.

It is recognized at this stage of the petroleum refining industry that heavy oils such as residual portions of crude oils and reduced crudes boiling above 650° F. comprising Conradson carbon producing components including asphaltenes and porphyrins boiling above about 1025° F. are less than desirable charge stocks in a normal gas oil catalytic cracking operation because the Conradson carbon producing components and metal contaminants rapidly reduce the catalyst cracking activity and selectivity as well as cause undesired yields of dry gas and coke at the expense of desired gasoline boiling range products.

Crude oils comprising metallo-organic compounds are known in which from 30 to 60 percent or more by volume comprise compounds boiling above about 650° F. with from about 10 to 30 volume percent of the total crude volume comprising compounds boiling above about 1025° F. or 1050° F. at atmospheric pressure. Because of the scarcity of high quality gas oils boiling in the range of 650° F. up to about 1025° F., it is now necessary to develop economical and efficient processes for converting residual oils, reduced crudes and more of the crude barrel to desired products of gasoline, gasoline precursors and light fuel oils.

It is also important economically to be able to employ existing processing equipment such as gas oil fluid catalytic cracking processing equipment for converting the less desirable residual oil feed stocks in the absence of major modification and reconstruction of existing equipment. That is, it is particularly desirable to offset the destructive effects of metal contaminants and high Conradson carbon feeds by employing some modified processing parameters rather than effecting major equipment changes. More important is the need to achieve conversion of more of the crude barrel to gasoline and gasoline precursors than obtainable with a more clean gas oil feed as accomplished in existing fluid catalytic cracking (FCC) operations.

Crude oils in the natural state contain a variety of metalloorganic compounds which contribute to undesirable catalyst functions in cracking the heaviest or resid portion of a crude oil. Among these compounds are coke precursors (asphaltenes, poly-nuclear aromatics of at least 5 rings); heavy metals such as iron, nickel, vanadium and copper as free metals, oxides and sulfides or combined as porphyrins in combination with deactivating amounts of sodium, potassium, sulfur and nitrogen materials. Materials such as high boiling asphaltenes tend to break down into coke during the cracking operation which deposits on the catalyst as carbonaceous or hydrocarbonaceous material thereby inactivating the catalyst cracking activity and particularly its selectivity. Metal deposits further contribute to this inactivation of catalyst particles beyond simple restoration techniques and such metals deposition can cause terminal deactivation of a crystalline zeolite structure employed in a cracking catalyst. It has been determined that the heavy metals transfer almost quantitively from the feed stock to a catalyst particle surface.

Numerous proposals are provided in the prior art for upgrading poor quality residual oil feeds to obtain desired gasoline products. These proposals include the combination of one or more of vacuum distillation solvent extraction, hydrotreating, thermal visbreaking in combination with catalytic cracking and combinations thereof, all of which are criticized as economically unattractive for processing high cost crude oil and particularly that of poor quality.

A number of patents in the prior art disclose the concept of passivating metal contaminants of nickel, vanadium, copper and iron by the addition of metals and compounds thereof selected from the group of magnesium, calcium, strontium, barium, scandium, titanium, chromium, molybdenium, manganese, cobalt, antimony, zinc, cadmium, zirconium, tin, lead and rare earth metals, all of which may or may not contribute to altering product selectivityy in a fluid catalytic cracking operation.

It is clear from the above that innovative if not dramatic processing contributions are desperately needed at this stage of the petroleum refining industry. The present invention is directed to a new and novel combination of fluid catalytic cracking processing restrictions and operating parameters which amount to a giant step forward in the catalytic conversion of reduced crudes to gasoline, gasoline precursors and higher boiling liquids and reducing problems associated with the production of gasoline, fuel oils and gasoline precursors from poor quality crudes.

The present invention further addressed itself to obtaining an efficient and economically attractive heat balanced operation for upgrading poor quality crude oils comprising residual portions of crude oils including atmospheric gas oils and higher boiling portions thereof known as vacuum gas oils and vacuum resid boiling above about 1025° F. to produce gasoline and other useful products. The present invention is also directed to a combination of operating parameters by which the catalyst operating life is retained for an extended onstream life during conversion of poor quality residual oils comprising components boiling above 1025° F.

SUMMARY OF THE INVENTION

The present invention relates to the method and arrangement of apparatus for effecting particularly the catalytic upgrading of gas oils with or without the presence of vacuum bottoms known in the art as vacuum resid and comprising metal contaminants as well as conradson carbon producing components. Thus, the method and arrangements of apparatus of this invention is for the catalytic upgrading of portions of crude oils such as topped crude oils, residual and reduced crude portions of crude oils as well as vacuum recovered gas oils with or without vacuum resid and the regeneration of catalyst particles so used in a two stage temperature restricted regeneration environment suitable for the purpose.

It is well known at this stage of the catalytic cracking art that during catalytic conversion of an oil feed, hydrocarbonaceous deposits and metal contaminants are deposited on the catalyst. The amount of these materials deposited depends on the boiling range of the feed and the severity of the cracking operations to which the feed is subjected. It is also known at this stage of the cracking art that the deposition of hydrocarbonaceous material when removed by combustion generates substantial heat of combustion which can be in an amount detrimental to the catalyst activity employed unless selective catalyst regeneration proceedures are employed. Thus it is considered easier to control the heat output generated in a two stage catalyst regeneration operation than in a single stage of catalyst regeneration. Other advantages attributed to a two stage regeneration operation over a single stage are discussed in the prior art. The present invention is concerned in one aspect with effecting the removal of carbonaceous deposits of hydrocarbon conversion in a two stage regeneration operation of reduced elevation whereby supporting structure and foundation requirements may be kept to a desired low order of magnitude. In yet another aspect the present invention is concerned with restricting the elevation of a hydrocarbon conversion operation whereby supporting structure and foundation requirement may be kept to a desired low order of magnitude. In a more particular aspect the present invention is concerned with an improved method of separating suspensions employed in a hydrocarbon conversion operation and the catalyst regeneration operation of the invention. Other significant improvemens achieved by the method and apparatus of this invention will be more particularly realized from the following discussion.

The method and arrangement of apparatus comprising this invention will be discussed in an operating mode particularly associated with the catalytic cracking of gas oils and heavier oil feeds. However, it is recognized that the apparatus is also suitable for effecting thermal visbreaking operations of heavy residual portions of crude oils with or without adding molecular hydrogen for upgrading heavy oil feed components boiling above about 1025° F. and known to include conradson carbon producing components. The thermal visbreaking operation may be effected in the presence of fluidizable solid particle materials selected from inert sorbent particle materials, clays of little cracking activity, spent zeolite or amorphous cracking catalyst of such low activity that they are unsuitable for further use in a catalytic cracking operation and combinations of the above.

Catalyst particles which may be usedin the apparatus arrangement of this invention with varying degrees of success particularly include faujasite type of crystalline zeolite of the ultrastable hydrogen exchanged variety, rare earth exchanges zeolites and combinations thereof. On the other hand the crystalline zeolite employed may be selected from a number of different crystalline zeolites known in the prior art. These include for example chabazite, mordanite, zeolite A, erionite, offertite and combinations thereof. The zeolite is dispersed in a matrix material, generally silicious and comprising one or more of alumina, zirconium, titanium, magnesium in combination with clay binder material.

An important aspect of the combination operation of this invention is concerned with achieving rapid and desired separation of hydrocarbon vapors from catalyst suspensions whereby the contact time there between may be restricted as desired to a low order of magnitude to achieve a high degree of selectivity in the product of cracking.

In yet another aspect the present invention is concerned with controlling the regeneration of fluid solid particles whereby formed suspensions in combustion supporting gas may be restricted and substantially completely separated in an apparatus environment commensurate with maintaining a thermally balanced operation contributing to maintaining high catalyst activity. That is, it is intended to restrict the temperature environment of the regeneration combination operation not to exceed about 1500° F. and preferrably limit the temperatures encountered in the sequence of regeneration steps below that contributing to thermal and hydrothermal damage to the catalyst particles employed. Thus, catalyst regeneration temperatures restricted to within the range of 1100° F. up to about 1500° F. and more usually not above about 1400° F. are particularly contemplated. The method and apparatus arrangement of this invention relies upon a combination of riser regeneration and dense fluid catalyst bed regeneration steps to achieve desired removal of hydrocarbonaceous deposits under restricted temperature condition. In this operating environment it is particularly desired to effect combustion removal of hydrogen from deposited hydrocarbonaceous material below hydrothermal damaging temperatures in a riser regeneration zone in conjunction with removing substantial carbonaceous deposits whereby an oxygen lean atmosphere employed produces a flue gas product comprising CO, steam, some $CO_2$ and sulfur oxides. In a particular aspect the riser regeneration operation is accomplished without exceeding a temperature of about 1350° F. and under some combustion operating conditions may be restricted not to exceed about 1300° F.

The conversion of the heavy oil feed such as residual oil and topped crudes or gas oils with suspended particles of a crystalline zeolite cracking catalyst is accomplished in a riser cracking zone modified as more particularly discussed below. The heavy oil feeds may be combined with gaseous diluent materials such as steam, C minus dry gases comprising hydrogen, poor quality naphtha such as straight run and thermally produced naphthas requiring catalytic upgrading. Thus, it is contemplated employing one or more gaseous hydrocarbons comprising $C_4$ and lower boiling hydrocarons with or without the presence of molecular hydrogen. It is also contemplated employing a hydrogen donor material which may be a hydrogenated product of the catalytic cracking operation particularly when processing residual oils comprising components boiling above about 1025° F. On the other hand the diluent employed may be primarily a viscosity reducing component and/or a gaseous fraction which is effective in obtaining desired atomization of the heavy oil feed charged to an upflowing suspension of catalyst particles. In yet another aspect it is contemplated separting the feed into a relatively low boiling fraction and a higher boiling fraction on the basis of aromatic index, carbon producing factor or boiling range. That is, it is contemplated cracking a light vacuum gas oil in combination with a middle distillate boiling above 400° F. in an initial portion of a riser cracking zone and charging a higher boiling fraction comprising a heavy vacuum gas oil or a vacuum resid portion to a more downstream portion of the riser cracking zone. It is generally preferred to charge the more refractory component of the feed to a bottom portion of the riser contact zone for contact with high temperature regenerated catalyst initially charged thereto and charging the less refractory high molecular weight components of the heavy oil feed to a more downstream portion of the riser cracking zone. In yet another aspect it is contemplated providing a riser cracking zone of smaller diameter in a lower bottom portion thereof than in an upper portion of the riser cracking zone. Thus, the hydrocarbon contact time and velocity within the riser cracking zone may be controlled within desired predetermined limits within respective sections of the riser conversion zone of different diameter limits. In this arrangement the hydrocarbon contact time in the more restricted diameter portion of the riser may be limited not to exceed about 1 second or other selected time interval with the hydrocarbon residence time in the upper larger diameter portion of the riser restricted to within the range of 0.5 to 2 seconds and most suitable for achieving desired conversion of the heavy oil feed charged thereto. In one particular embodiment it is contemplated charging a heavy vacuum gas oil with higher boiling resid material to the riser in the transition section between the small and larger diameter portions of the riser.

A particularly important aspect of the riser cracking operation of this invention is concerned with achieving rapid and more complete separation of the suspension discharged from the riser following a desired selected contact time therein. In accordance with this invention an upper portion of the riser contact zone comprises a generally horizontal section thereof which is open ended and discharges tangentially into a relatively large cylindrical zone closed at the top but open in the bottom portion thereof. Vaporous product material and diluent material centrifugally separated from catalyst particles in the large cylindrical zone are withdrawn from said cylindrical zone by a coaxially aligned conduit open in the bottom end thereof and communicating openly there above with a plurality of confined radiating passageways positioned above the closed top of the cylindrical zone. A cyclone separation zone is openly attached to the outer end of each passageway to receive vaporous material passed through said passageway to said cyclone wherein any entrained catalyst fines are separated from vaporous product and received by diplegs provided. Catalyst particles separated from vaporous material in said large cylindrical zone and said cyclone separation zones are collected and stripped before being passed to catalyst regeneration.

The catalyst regeneration operation briefly discussed above is a two stage regeneration operation comprising a riser regeneration zone followed by a dense fluid bed catalyst regeneration zone. The riser regeneration zone is provided with a vertical contact section followed by a horizontal contact section which discharges the suspension into a cylindrical centrifugal separating and disengaging zone. The riser regenerator may be of constant diameter in its vertical and horizontal sections. On the other hand a bottom portion of the vertical section of the riser regenerator may be of larger diameter to provide an initial mixing section for spent catalyst particles, partially regenerated catalyst particles or more completely regenerated high temperature catalyst particles and oxygen containing combustion supporting gas. Partially regenerated catalyst particles separated from flue gases as more fully discussed below are passed to a second stage of catalyst regeneration and completed as desired as a dense fluid bed of particles being regenerated.

The regeneration apparatus arrangement of the invention provides for a selective combustion of combustible components comprising hydrogen, coke or carbonaceous material and formed carbon monoxide. The regeneration operation of this invention recognizes the kinetic differences between oxidation of hydrogen, coke and carbon monoxide. Therefore, carefully controlled separate regions for oxidation of combustible components are provided in the combination of regeneration steps of this invention. In a more particular aspect, an oxygen lean atmosphere is maintained within the riser regeneration stage accomplished initially with a catalyst particle concentration density in the range of about 10 to 30 lbs per cubic foot in the bottom catalyst mixing portion of the riser regeneration zone. The more restricted diameter portion of the riser regeneration zone may employ a particle concentration density within the range of 1 to about 10 lbs per cubic foot and more usually not above about 5 lbs per cu. ft. It will be recognized that the particle concentration within the riser may be varied considerably depending upon the regeneration condition selected for the purpose. In a particular aspect, the riser regeneration operation of the invention is intended to accomplish a temperature controlled combustion of hydrogen in the hydrocarbonaceous deposits of the oil feed conversion in combination with oxidation of coke to produce particularly a CO rich flue gas product comprising $CO_2$ and sulfur oxides. Thus, a partial regeneration of the catalyst comprising hydrocarbonaceous deposits is intended to be accomplished at a temperature selected not to exceed about 1300° F. or 1350° F. with an oxygen lean atmosphere such as air diluted with $CO_2$ and/or comprising steam. The thus partially regenerated catalyst is separated from combustion product flue gases and collected as a mass of catalyst particles for transfer to a second stage of catalyst regeneration. In the second stage of catalyst regeneration, the partially regenerated catalyst is more completely regenerated as a dense fluid bed of catalyst by contact with an oxygen rich atmosphere but restrained from developing a regeneration temperature substantially above 1450° F. and preferably maintained below about 1450° F.

An important aspect of the combination regeneration operation of this invention provides for recycle of partial or more completely regenerated catalyst particles to a bottom portion of the riser regeneration zone for admixture with oxygen lean regeneration gas and the spent catalyst particles obtained from the hydrocarbon stripping zone. That is, in one operating embodiment a portion of the partially regenerated catalyst at a temperature within the range of 1300° to 1350° F. and separated from the flue gas of the riser regeneration operation is recycled to a bottom portion of the riser regeneration zone for admixture with spent catalyst at a temperature in the range of about 950° to 1050° F. and an oxygen lean combustion supporting gas plus diluent which may be preheated up to about 400° F. to form a mixture thereof promoting rapid ignition of combustible components and particularly hydrogen associated with hydrocarbonaceous deposits. It is desired to achieve substantially complete hydrogen combustion in the riser regeneration zone and prior to passing the partially regenerated catalyst to the second stage dense fluid bed catalyst regeneration stage. In yet another embodiment it is contemplated recycling some more completely regenerated higher temperature catalyst particles from a second stage of catalyst regeneration to a bottom portion of said riser regeneration zone either above or in admixture with the recycled partially regenerated catalyst as above discussed. In any of these embodiments it is intended that the recycle of catalyst particles be sufficient to raise the temperature of the spent catalyst particles an amount which is sufficient to promote rapid ignition of carbonaceous material and the hydrogen component of the hydrocarbonaceous deposits. Catalyst particles more completely regenerated in the second stage dense fluid bed operation and recovered at an elevated temperature generally in the range of about 1400° F. to about 1500° F. are recycled directly to a bottom lower portion of the heavy oil feed riser conversion zone.

It is contemplated in a further embodiment of providing a riser stripping zone not shown following recovery of spent catalyst particles from an initial stripping step herein discussed to provide a separate higher temperature stage of stripping above about 1000° F. by admixing a portion of the partially regenerated catalyst recovered from the riser regeneration zone with the spent catalyst passed to the riser stripping zone.

BRIEF DESCRIPTION OF THE DRAWINGS

FIG. I is a diagrammatic sketch in elevation of the arrangement of apparatus for effecting the catalytic cracking of oil feeds in a riser conversion zone, stripping of spent catalyst separated centrifugally from hydrocarbon product vapors, regeneration of stripped catalyst in two sequential and separate stages of catalyst regeneration and interconnecting conduits for circulation of catalyst between zones as herein identified.

FIG. II is a diagrammatic sketch of a two stage regeneration operation comprising a riser regeneration zone in combination with an annular second stage dense fluid bed catalyst regeneration zone.

DISCUSSION OF SPECIFIC EMBODIMENTS

Figure 2:
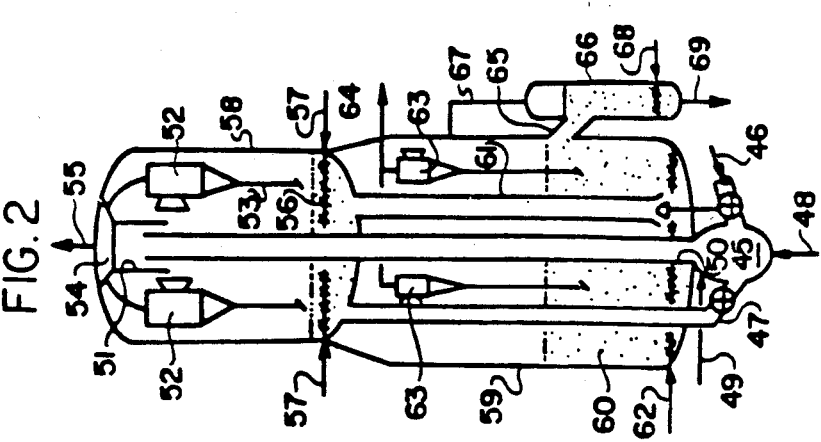

Referring now to FIG. I by way of examle there is shown a riser reaction zone 1 of smaller diameter in a bottom portion than in an upper portion thereof. Conduit means 2 provides for charging the oil feed to be converted to a bottom portion of the riser admixed with diluent gasiform material which may or may not comprise hydrogen and introduced by conduit 3. On the other hand the oil feed may be charged to the riser downstream of the catalyst inlet by conduit 4 admixed with diluent material charged by conduit 2 to form a suspension with catalyst charged by conduit 6 to a bottom portion of riser 1. The suspension thus formed is then contacted with an atomized feed charged by conduit 4. On the other hand all of the oil feed or only a high boiling portion of the oil feed to be converted is charged to a more downstream portion of the riser in particularly a transition section between the change of riser diameters by a plurality of feed inlet atomizing spray nozzles 7 charged with heavy oil feed and diluent by conduit 8. A suspension is formed in the riser hydrocarbon conversion zone comprising catalyst particles, diluent and oil feed vaporous product wherein the catalyst to oil feed ratio is maintained in the range of about 5 to 15 wt. ratio.

The upflowing suspension comprising hydrocarbon vapors of catalytic cracking and atomizing diluent material is discharged horizontally from an upper portion of the riser conversion zone and tangentially into a relatively large cylindrical zone 9 of larger diameter than a cyclone separation zone for centrifugal separation of the catalyst-vapor suspension charged thereto. The large cylindrical zone is open in the bottom end thereof but closed in the top end thereof except for a conduit 10 coaxially aligned with said large cylindrical zone and extending downwardly a short distance below the top of the cylindrical zone. Preferably the bottom open end of conduit 10 terminates on a horizontal plane intermediate the upper and lower sides of the tangential inlet of the horizontal section of the riser reaction zone. Vaporous product material and gasiform material separated from catalyst particles pass upwardly through conduit 10 for distribution through a plurality of horizontally radiating conduit passageways 11 communicating with a cyclone separation zone 12 on the outer end of each passageway. The cyclones may be positioned about the outer perimeter of the large cylindrical zone 9 or above the top surface of the cylindrical zone. Diplegs 13 are provided for passing cyclone separated catalyst fines to a bed of catalyst particles collected below the bottom open end of the cylindrical zone and at the entrance to a lower catalyst stripping zone. Vaporous material separated from catalyst fines is withdrawn from the cyclone separation zones by conduits 14 for recovery in a common plenum chanber 15 and withdrawal by conduit 16 for passage to a fractionation zone not shown.

The catalyst particles separated and collected as above discussed pass downwardly through a stripping zone provided with flow directing baffles and counter current to stripping gas charged thereto by conduits 18 and 19. The stripping gas, usually steam, charged to the stripper at two different levels is of relatively low velocity sufficient to maintain the catalyst particles contaminated with hydrocarbonaceous material in a fluid like downflowing condition. The stripping gas and stripped vaporous components pass upwardly into the bottom open end of the large cylindrical zone for recovery with centrifugally separated vapors as above discussed. The catalyst stripped as above discussed is then passed by conduit 20 to the lower bottom portion 21 of a riser regeneration zone.

In the specific arrangement of FIG. I, the riser regenerator is of larger diameter in a bottom portion 21 than in the upper portion 22 thereof. In this arrangement, the spent catalyst particles comprising hydrocarbonaceous deposits are mixed with recycled regenerated catalyst charged by conduit 23a and oxygen lean regeneration gas charged by conduit 24. On the other hand a riser mixing zone for spent catalyst, regenerated catalyst and regeneration gas in open communication with the enlarged bottom portion of the riser may be provided although not shown on the drawing. Regeneration by combustion of hydrocarbonaceous deposits is rapidly initiated in a bottom portion of the riser regeneration zone as a relatively dense suspension which thereafter passes upwardly as a more dilute suspension through the riser regenerator to a horizontal section thereof discharging tangentially into a relatively large cylindrical zone 23 open in a bottom portion thereof but closed in a top portion thereof except as herein discussed. Additional suspension transport gas such as $CO_2$, steam or a mixture thereof which may or may not comprise oxygen is charged to the riser by conduit 24a. The regeneration operation effected in the riser regenerator is maintained under conditions restricted to achieve a partial removal of combustible material essentially comprising all of the hydrogen present in the hydrocarbonaceous deposit and at least about 50 weight percent or more of the carbonaceous deposits on the catalyst. The partially regenerated catalyst suspended in flue gas comprising CO, $CO_2$ and steam is discharged horizontally from the riser and tangentially into the large cylindrical zone 23 for centrifugal separation of partially regenerated catalyst from CO rich flue gases. Flue gases separated from partially regenerated catalyst by centrifugal separation in cylinder 23 are withdrawn by conduit means 24b open in the bottom end and coaxially aligned within the cylinder 23. The bottom open end of withdrawal conduit 24b terminates on a horizontal plane intermediate the upper and lower sides of the riser horizontal portion tangential inlet to cylindrical section 23. Conduit 24b is in open communication at its upper end above cylindrical section 23 with a plurality of horizontally radiating conduits or passageways 25 provided with cyclone separating means 26 on the outer end of each radiating passageway 25. Catalyst fines separated in cyclones 26 from CO rich flue gases are passed by diplegs 27 to a mass of partially regenerated catalyst collected in a bottom portion of vessel 28 encompassing the flue gas separating means above discussed. Vessel 29 is in open communication in the bottom portion thereof with stripping zone 17 and houses the hydrocarbon product separating means comprising cylindrical zone 9, passageways 10 and 11 communicating with cyclones 12.

The partially regenerated catalyst collected as bed or mass 30 in a bottom portion of vessel means 28 is fluffed or gently fluidized as required by gaseous inlet means not shown. On the other hand the bottom of vessel 28 may be shaped as a cone rather than dish shaped as shown in the drawing. In accordance with one aspect of this invention, partially regenerated catalyst at an elevated temperature of at least 1300° F. is withdrawn by standpipe 31 from bed 30 and communicates with conduit 23a for passage to a bottom portion of the riser regeneration zone 21 for mixing with the spent catalyst charged to the bottom of the riser regenerator by conduit 20 and oxygen containing gas charged by conduit 24. In one particular aspect it is desired to provide a mix temperature of at least 1100° or 1150° F. and preferably at least 1200° F. in the mixing section of the riser regeneration zone.

A more complete regeneration of the partially regenerated catalyst collected as bed 30 is accomplished in a second separate regeneration zone 32 shown positioned beneath vessel zone 28. That is, the partially regenerated catalyst is passed downwardly by standpipe 33 from bed 30 to the lower portion of a second dense fluid bed of particles 34 in a lower portion of vessel zone 32. A plug valve 35 controls the flow rate of catalyst discharged from the bottom of standpipe 33 into the catalyst bed 34. Oxygen rich regeneration gas is charged to a bottom portion of bed 34 for flow upwardly therethrough by conduit inlet means 36 and 37 communicating with suitable regeneration gas distributor means.

Regeneration of the catalyst in bed 34 with oxygen containing gas may be accomplished under different operating conditions depending on the residual coke if any retained on the catalyst particles. Furthermore the more complete regeneration of the catalyst may be accomplished at a temperature equal to or above the temperature of the catalyst particles recovered as bed 30. It is preferred that sufficient oxygen be present for example to produce a $CO_2$ rich flue gas and retain a residual coke on catalyst following combustion within the range of about 0.05 up to about 0.15 or 0.2 wt % and a flue gas product temperature within the range of 1350° to 1500° F. Regenerated catalyst is withdrawn from an upper portion of bed 34 and passed by conduit 6 to the lower bottom portion of riser 1 for reuse in the hydrocarbon oil feed riser conversion zone discussed above. A portion of the regenerated catalyst of bed 34 may also be withdrawn from a top portion of the bed for passage by conduits 38 and 23a to the lower portion of the riser regeneration zone. Flue gas products of combustion pass through cyclone separation zones 39 provided with diplegs 40 for return of separated fines to bed 34. $CO_2$ rich flue gases with or without some unconsumed oxygen are withdrawn from the cyclone separation zone by a common manifold means generally identified as conduit 41.

Figure 1:
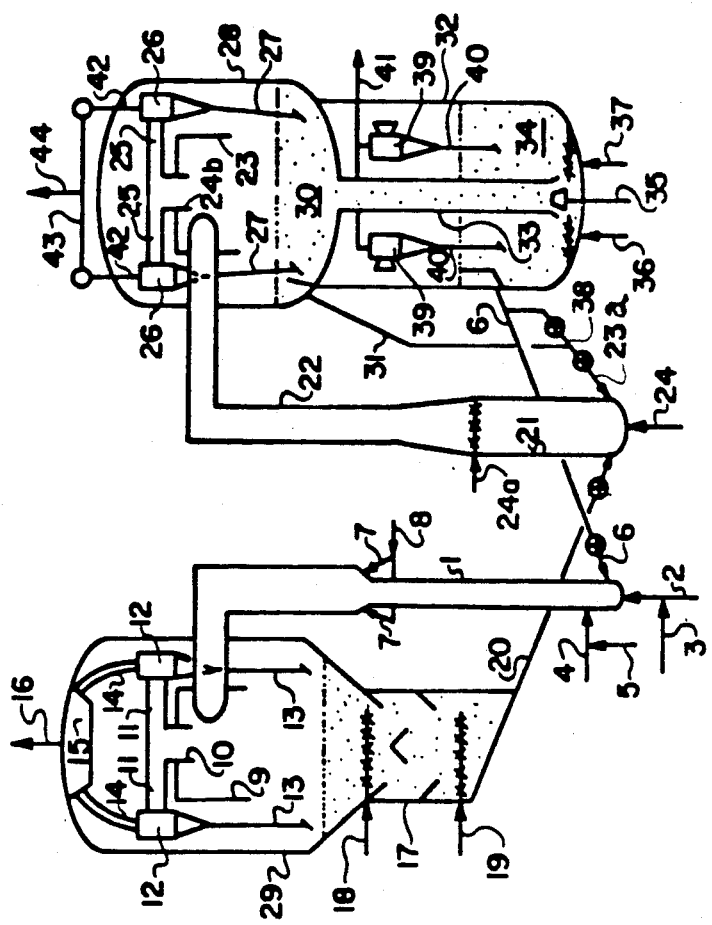

The regeneration system of FIG. 1 may be modified particularly with respect to disengaging vessel 28 by eliminating the cylindrical means 23 and the downstream flue gas recovery system attached thereto and replacing it with the following arrangement. That is, the suspension of partially regenerated catalyst and CO rich flue gas may be directed downwardly from the discharge end of the horizontal sections of the regeneration zone to form the collected mass of catalyst particles 30. Flue gases separated from this discharged suspension may then pass through a plurality of parallel arranged cyclone separation zones usually comprising 2 or more zones in sequence in the upper portion of the disengaging vessel. On the other hand the suspension discharged from the riser regeneration operation may impinge generally horizontally against of downwardly sloping baffle means or against an inverted "L" shaped baffle means to effect initial separation of the discharged partially regenerated catalyst suspension. In yet another aspect the flue gases are passed through cyclones represented by cyclones 26 which may communicate with a common flue gas collection means such as a manifold or a plenum chamber positioned within vessel 28 (not shown) rather than being withdrawn by conduits 42 to a common manifold 43 and withdrawal conduit 44 outside of vessel 28.

The arrangement of apparatus of FIG. I is intended to be a relatively low profile system which substantially minimizes the vertical height of a riser contact means for hydrocarbon conversion and a first stage catalyst regeneration. Thus the suspension discharged horizontally from the first stage of regeneration may be discharged initially tangentially into a relatively small diameter vessel not shown and provided with flue gas cyclone separation means within or external to the small diameter vessel. Separated fines may be collected and passed directly to a bed of catalyst in the second stage of regeneration and/or recycled to a bottom portion of said riser transport regeneration zone herein discussed.

The regeneration arrangement of FIG. I may be replaced by the regeneration apparatus arrangement of FIG. II comprising a stacked arrangement of vessels comprising an internal riser regeneration zone. In this arrangement of FIG. II a riser regeneration zone 50 provided with a bottom bulb mixing zone 45 forms the mixing zone required to form a suspension of spent catalyst particles charged by conduit 46 and recycled hot regenerated catalyst charged as by conduit 47 or otherwise provided as herein discussed. An oxygen lean regeneration gas supplemented with $CO_2$ and/or steam is charged separately or in admixture with one another by one or both of conduits 48 and 49. That oxygen lean gas or a mixture of steam and $CO_2$ preheated to an elevated temperature of at least 900° F. may be charged by conduit 48 to achieve initial mixing of spent and partially regenerated catalyst to form an upflowing suspension. The formed suspension may then be contacted with steam and $CO_2$ or with the oxygen lean gas charged by conduit 49. This arrangement is also intended for FIG. I riser operation use. Regeneration of the catalyst particles to achieve at least 50% carbon removal and more preferably up to about 60% carbon removal is accomplished in the riser regeneration zone operation as the suspension passes upwardly through the more restricted diameter portion 50 of the riser. In the specific arrangement of the figure, the suspension is discharged from the upper open end of the riser which is surrounded by a relatively short larger diameter cylindrical baffle member 51 to form an annular space therewith through which the suspension passes downwardly. The baffle is hung from a bottom of the plenum chamber 54 with the inlet to the cyclones being outside the baffle means but adjacent the lower end thereof for recovery of flue gases and fluidizing gases introduced by conduits 57. A mass of partially regenerated catalyst particles 56 collected with cyclone separated fines in diplegs 53 is maintained fluid by gaseous material charged by means 57 in a bottom portion of vessel zone 58. Flue gases separated from entrained fines are collected in plenum 54 and withdrawn by conduit 55.

The partially regenerated catalyst collected as bed 56 is passed to a lower annular vessel regeneration zone 59 comprising catalyst bed 60 by standpipe 61. Standpipe 61 may be an external standpipe extending from an upper portion of bed 56 to a bottom portion of bed 60. Oxygen rich regeneration gas is charged to a bottom portion of bed 60 by conduit 62 communicating with an annular regeneration gas distributor means. There may be more than one regeneration gas inlet 62 communicating with the annular distributor means about riser 50. Cyclone separating means 63 and combinations thereof comprising at least two cyclones in sequential arrangement are provided in an upper portion of regeneration vessel 59 for separating catalyst fines from $CO_2$ rich flue gases removed by conduit 64. The cyclones are provided with diplegs to return separated fines to the catalyst bed 60. Regenerated catalyst which may comprise some residual coke is withdrawn from a upper portion of bed 60 by conduit 65 for passage to an external stripping vessel zone 66 wherein the catalyst is stripped of any entrained oxygen and CO with a $CO_2$ rich gas charged by conduit 68. Stripping gas is recovered from zone 66 by conduit 67 for passage to an upper portion of vessel 59 and above bed 60. The stripped catalyst is withdrawn from the bottom of vessel 66 by conduit 69 for passage to a hydrocarbon feed riser cracking zone such as riser 1 of FIG. I. A portion of the regenerated catalyst in bed 60 may be passed by means not shown to a bottom portion of riser zone 45. On the other hand, a portion of the stripped catalyst withdrawn from stripper 66 may be recycled to a bottom portion of the riser zone by separate means not shown or in admixture with spent catalyst particles charged by conduit 46.

It will be recognized by those skilled in the regeneration art that the elevation profile of the regeneration arrangement of FIG. II may provide a higher elevation profile than that of FIG. I. However, the elevation profile of FIG. II may be reduced substantially by maintaining the bulb portion 45 shown in the drawing as a small extended portion of the riser sufficient only to introduce oxygen lean regeneration gases, spent and recycled catalyst thereto. In any of these arrangements the amount of partially regenerated and more completely regenerated catalyst recycled to a bottom portion of the riser regeneration zone will be proportionately adjusted to obtain a desired mix temperature with the spent catalyst charged thereto. Thus, it is particularly contemplated using none of the more completely regenerated catalyst obtained from the second stage of regeneration of either FIG. I or II in an initial portion of the riser regeneration zone. The overall height of FIG. II may be kept to a desired low minimum by also maintaining vessel zone 58 as small as possible wherein the riser suspension is separated.

The temperature, pressure and space velocity conditions employed in the regeneration arrangement of FIG. II may be similar to or different than these identified above for FIG. I. The concentration of catalyst particles in the small mixing zone 45 of FIG. II may be less than that employed in the larger mixing zone configuration of FIG. I. In either of these arrangements it is preferred to restrict the riser regeneration temperature from exceeding about 1300° or 1350° F. and retaining the regeneration temperature of the second stage of regeneration within the range of about 1350° to about 1450° F. In yet another aspect it is desirable to keep vessels 28 and 29 of FIG. I as small as possible and this may be accomplished in part by restricting the diameter of separating cylindrical means 9, 23 and 51 positioned within the suspension separation vessel of FIGS. I and II.

Having thus generally described and discussed specific embodiments in support of the concepts of this invention it is to be understood that no undue restrictions are to be imposed by reasons thereof except as defined by the following claims:

What is claimed is:

1. A method for converting high boiling hydrocarbons to form gaseous and liquid fuels comprising gasoline which comprises:
   A. passing a suspension of fluid solid catalyst particles and a charged high boiling hydrocarbon fraction at an elevated conversion temperature upwardly through a riser conversion zone,
   B. discharging vaporous products of hydrocarbon conversion comprising suspended catalyst particles through a downstream horizontal portion of said riser zone and tangentially into a single inverted cup zone open in the bottom portion thereof and housed in a solid particle collection zone,
   C. centrifugally separating said discharged suspension in said inverted cup zone into a vapor hydrocarbon phase and a fluid solid particle phase,
   D. passing the centrifugally separated catalyst phase from the bottom of said open cup zone into a lower dense downwardly flowing mass of catalyst particles counter current to stripping gas charged to a stripping zone,
   E. passing the centrifugally separated vapor phase through a passageway extending upwardly through the top of said inverted cup zone into and through a plurality of adjacent radiating passageways to an external cyclone separation zone at the end of each radiating passageway,
   F. separating catalyst fines from vaporous hydrocarbons in said cyclone separation zones and separately recovering vaporous hydrocarbons therefrom,
   G. passing cyclone separated catalyst fines by diplegs from said cyclone zones to said mass of down-flowing particles in said stripping zone, and
   H. passing separate streams of stripping gas to a bottom and an upper portion of said stripping zone for flow upwardly therethrough and into said cup zone counter-current to down flowing catalyst particles therefrom.

2. The method of claim 1 wherein the riser conversion zone is of a larger diameter in an upper vertical portion thereof than a lower vertical portion thereof, a more refractory portion of the feed is charged to the lower portion of the riser with a less refractory portion of the feed being charged to the larger diameter portion of the riser.

3. The method of claim 1 wherein a light vacuum gas oil in combination with an atmospheric middle distillate portion of a crude oil boiling above gasoline is charged to a rising suspension of the fluid solid particles in a lower portion of the riser conversion zone above one inlet of regenerated catalysts thereto and a heavy oil feed comprising vacuum gas oil admixed with a hydrogen contributing diluent material is charged to a transition section of the riser between smaller and larger diameter vertical sections of the riser conversion zone, the larger diameter section being upstream of said horizontal portion and downstream of the smaller diameter section.

4. The method of claim 1 wherein the stripping gas and stripped vaporous conversion products pass upwardly from said stripping zone into the bottom of said cup zone for recovery with centrifugally separated vapor phase products of the riser hydrocarbon conversion operation.

5. The method of claim 1 wherein the stripped catalysts are passed to the bottom portion of a riser regeneration zone for admixture with partially regenerated catalysts obtained as herein after defined and oxygen lean gas admixed with one or a combination of steam and $CO_2$, passing the mixture thus formed as a suspension upwardly through said riser regeneration zone under temperature conditions effecting partial removal of hydrocarbonaceous deposits of said hydrocarbon conversion passing said rising suspension horizontally through said riser regeneration zone in a downstream end thereof and tangentially into an inverted cup cylindrical zone open in the bottom end thereof at a velocity sufficient to effect centrifugal separation of partially regenerated catalysts from CO rich flue gases, passing centrifugally separated partially regenerated catalyst particles downwardly from the open bottom of said cylindrical zone into a collected mass of partially regenerated fluidized catalyst particles, recovering CO rich fluid gases from said cup separation zone through an upwardly extending open end passageway in open communication with a plurality of adjacent radially extending passageways above said cup zone, said radial passageways in open communication with a cyclone separation zone at the outer of each passageway for separating CO rich flue gases from entrained catalyst particle fines, recovering CO rich flue gases separately from the catalyst fines from said cyclone separation zone, passing a portion of the partially regenerated catalyst separated by said cup zone and said cyclones as above defined to a bottom portion of said riser regeneration zone for admixture with catalyst particles comprising hydrocarbonaceous products of conversion, passing the remaining portion of said partially regenerated catalyst to a second separate stage of catalyst particle regeneration comprising a dense fluid bed of catalyst particles being contacted with an oxygen rich regeneration gas to obtain more complete removal of carbonaceous deposits by combustion and recovering and recycling at least a portion of said more completely regenerated fluid catalyst particles from said second stage of regeneration to said hydrocarbon riser conversion zone and at least a portion thereof to said riser regeneration zone.

6. The method of claim 5 wherein the combination of regeneration operations are temperature restricted not to exceed about 1500° F. and a portion of the regenerated catalyst from said second regeneration stage is recycled to said riser regeneration zone in an amount to form a mix temperature of catalyst particles therein sufficient to promote rapid combustion ignition of hydrocarbonaceous deposits.

7. The method of claim 5 wherein the riser regeneration zone is external to the second stage regeneration zone and catalyst particles separated from said flue gases are passed by a stand pipe to a bottom portion of said dense fluid bed of catalyst in said second stage regeneration zone for generally upward flow therein during said more complete removal of carbonaceous deposits.

8. The method of claim 5 wherein said riser regeneration temperature is restricted to within the temperature range of 1100° F. to 1350° F. and said second stage of regeneration is restricted to within the temperature range of 1300° F. to 1500° F.

9. A method for effecting the catalytic conversion of a hydrocarbon oil feed and regeneration of fluid catalyst particles used therein to remove hydrocarbonaceous deposits to a level less than 0.15 wt% which comprises,
   A. passing a hydrogen oil feed material boiling above gasoline mixed with an atomizing diluent material in downstream contact with a rising suspension of hot catalyst particles in a riser conversion zone comprising a downstream horizontal section, said catalyst regeneration effected at a temperature within the range of 1300° to 1500° F. prior to mixture with oil feed in the riser conversion zone,
   B. passing vaporous hydrocarbon products of catalytic conversion with suspended catalyst particles through a horizontal portion of said riser conversion zone and tangentially into an inverted cup zone open in the bottom thereof and provided with a vertical coaxial flow through open passageway communicating with a plurality of radiating passageways above said cap surface to cyclone separation zones outside said cup zone,
   C. effecting centrifugal separation of vaporous material from catalyst particles in said cup zone prior to passing vaporous material through said open coaxial and radiating passageways,
   D. cyclonically separating catalyst fines from vaporous material following passage through said passageways,
   E. collecting said centrifugally and cyclonically separated catalyst particles as a downflowing dense fluid mass of catalyst particles in a stripping zone, passing stripped vaporous material upwardly from said dense fluid mass into the open bottom end of said inverted cup zone,
   F. passing stripped spent catalyst to a bottom portion of a riser regeneration zone, passing partially regenerated hot catalyst particles and an oxygen lean gaseous mixture to a bottom portion of said riser regeneration zone for admixture with spent catalyst to form an upflowing suspension thereof under restricted oxygen combustion temperature conditions,
   G. passing said suspension undergoing combustion in an oxygen lean atmosphere through said riser generation zone to a downstream horizontal portion of said riser regeneration zone and thence tangentially into a cylindrical inverted cup zone providing for centrifugal separation of catalyst particles from flue gas product of said oxygen lean riser regeneration operation,
   H. passing centrifugally separated partially regenerated catalyst particles as a collected mass to a bottom portion of an upflowing dense fluid bed of catalyst being regenerated with an oxygen rich atmosphere in a separate second stage of catalyst regeneration,
   J. passing another portion of said centrifugally separated catalyst particles of said riser regeneration operation to a bottom portion of said riser regeneration zone for admixture with spent catalyst particles,
   K. effecting more complete regeneration of catalyst particles in said second stage as a dense fluid bed catalyst regeneration operation under conditions providing a $CO_2$ rich flue gas to obtain catalyst particles comprising not more than about 0.15 wt% of residual coke thereon at a temperature below 1500° F., and
   L. Recycling at least a portion of said regenerated catalyst from said second stage dense fluid bed catalyst regeneration to a bottom portion of said riser conversion zone.

10. The method of claim 9 wherein catalyst stripped of vaporous material in said downflowing dense fluid mass is passed through a second stage riser stripping zone at a more elevated temperature in admixture with regenerated catalyst particles of said riser regeneration zone or said second stage of regeneration to provide a higher temperature stripping operation prior to passing catalyst particles comprising hydrocarbonaceous deposits to said riser regeneration zone.

11. The method of claim 9 wherein the oil feed is a topped crude oil portion or a residual portion of a crude oil comprising gas oils boiling above about 600° or 650° F. which is charged with atomizing diluent material to a lower portion of the riser hydrocarbon conversion zone above the inlet of regenerated catalyst charged thereto and an atomized heavier portion of the oil feed comprising vacuum resid is charged to a more downstream section of riser hydrocarbon conversion zone beneath or at the juncture of the vertical and the horizontal section of the riser conversion zone.

12. A method for converting a crude oil into lower molecular products and regeneration of catalyst particles used in said crude oil conversion which comprises:
   A. charging regenerated catalyst at a temperature in the range of 1350° F. to 1500° F. to the bottom portion of a riser hydrocarbon conversion zone and forming an upflowing suspension of the charged catalyst particles in a dry gas product of catalytic cracking comprising hydrogen in said riser conversion zone,
   B. charging a light vacuum gas oil comprising fraction of crude oil boiling above gasoline to a lower portion of the upflowing suspension of catalyst particles in the riser conversion zone under conditions effecting conversion thereof to liquid fuel products comprising gasoline,
   C. charging a heavy fraction of said crude oil higher boiling than said light oil fraction to a more downstream portion of said riser conversion zone for contact with said catalyst in the presence of vaporous products of said light oil feed conversion products, D. discharging the suspension in the riser from a downstream horizontal zone thereof tangentially into an inverted cup shaped zone providing for withdrawal of vaporous products upwardly from a central portion thereof into radiating passageways provided with a cyclone separation zone on the outer end thereof external to said cup shaped zone, E. passing catalyst particles separated centrifugally in said cup shaped zone downwardly as a dense fluid mass of particles through a stripping zone counter current to stripping gas separately charged to an upper and lower portion of said stripping zone, wherein said stripping gas after counter current passage through said mass of particles enters said cup zone F. mixing the stripped catalyst with sufficient partially regenerated catalyst to form a mixed temperature thereof of at least 1000° F. and contacting the mixture with a stripping gas in a riser stripping zone, G. forming a mixture of stripped spent catalyst, partially regenerated catalyst and an oxygen lean combustion supporting gas in the lower portion of a riser regeneration zone, passing the mixture thus formed upwardly through said riser regeneration zone to a downstream restricted diameter section thereof discharging horizontally and tangentially into an inverted cup shaped suspension separation zone, withdrawing flue gas products separated from catalyst particles upwardly from a central portion of said cup shaped zone into radiating passageways provided with a cyclone separation zone on the outer end thereof and external to said cup shaped zone, withdrawing flue gases from said cyclone separation zones as a combined flue gas stream comprising carbon monoxide, thereby effecting partial removal of carbonaceous material from the catalyst, H. passing catalyst particles separated from the riser regeneration flue gas to each of said riser regeneration zone and to a second separate stage of dense fluid bed catalyst regeneration, thereby effecting more complete removal of carbonaceous material from said partially regenerated catalyst in each of said riser regeneration zone and said dense fluid bed second separate catalyst regeneration operation, and I. passing regenerated catalyst from said dense fluid bed regeneration operation to said riser hydrocarbon conversion zone.

13. The method of claim 12 wherein the oxygen lean regeneration gas is mixed with one or a combination of $CO_2$ and steam.

14. The method of claim 12 wherein regenerated catalyst of the second regeneration zone is stripped to remove combustion supporting amounts of gaseous material prior to passing the regenerated catalyst to said hydrocarbon conversion zone.

15. The method of claim 12 wherein a portion of the regenerated catalyst obtained in said second regeneration zone is passed to a bottom portion of said riser regeneration zone as required to form a mixture with spent catalyst particles, partially regenerated catalyst particles, and oxygen lean regeneration gas to form a mixture at a temperature of at least 1200° F.

16. The method of claim 12 wherein the heavy fraction of the crude oil is charged to a larger diameter downstream section of the riser conversion zone.

* * * * *